Patented Oct. 12, 1937

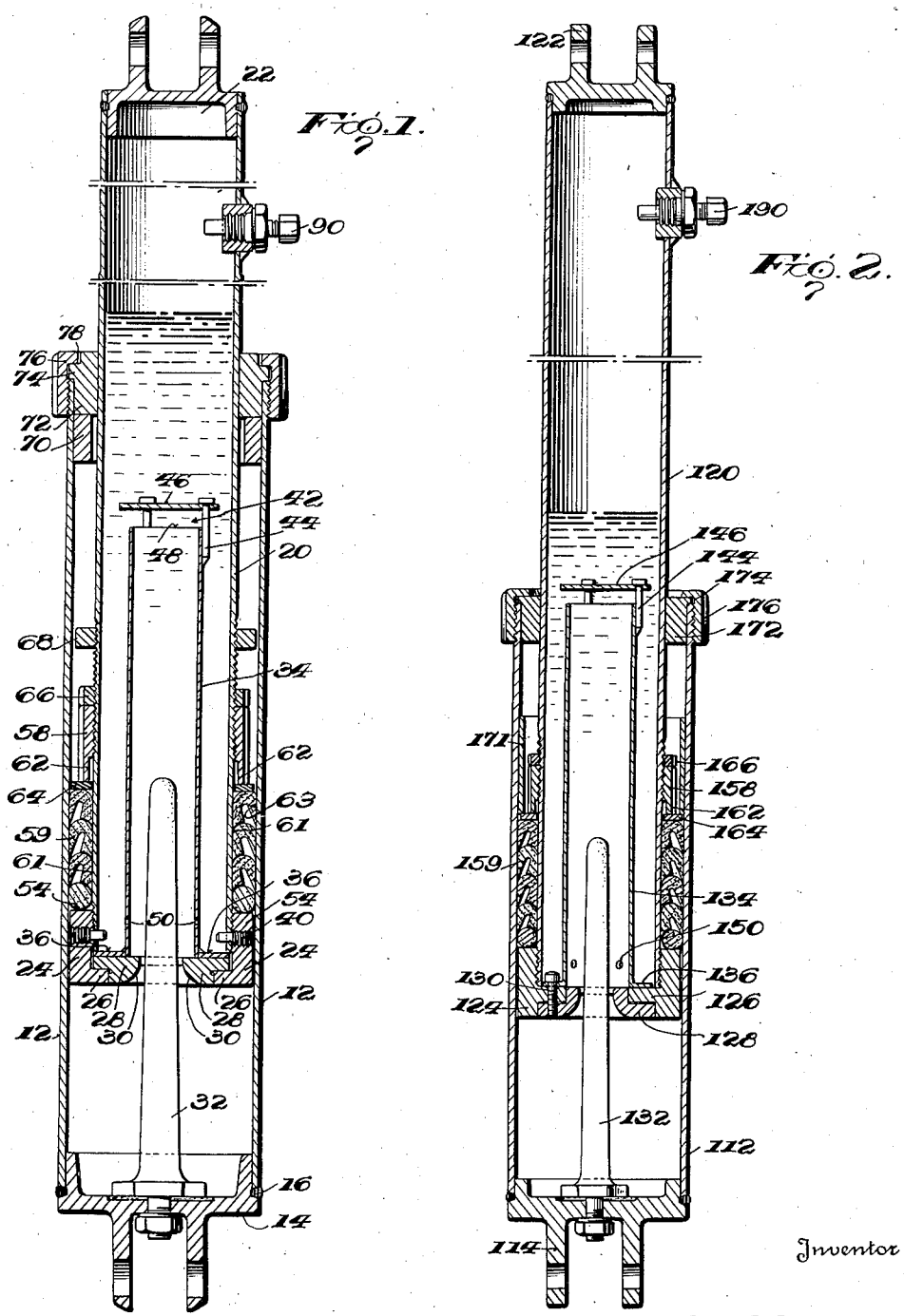

2,095,748

UNITED STATES PATENT OFFICE 2,095,748

OLEO GEAR

Carl V. Johnson, South Bend, Ind., assignor to Bendix Aviation Corporation, South Bend, Ind., a corporation of Delaware Application April 26, 1934, Serial No. 722,573

14 Claims. (Cl. 267—64)

This invention relates to shock absorbers and more particularly to shock struts for aviation landing gears.

Shock struts for aviation use of the hydraulic pneumatic type, generally require high air pressures in order to maintain the diameter of the strut at a minimum, and, to prevent loss of pressure due to leakage between the sliding members special forms of packings and arrangements thereof relative to the strut are required. This particular invention has to do with the arrangement of a packing which is entirely enclosed and which slides upon an enclosed surface thereby protecting the same from dirt, dust and injury resulting from careless use of tools. Further since the strut must be of minimum weight and adapted to carry shock loads, its design and arrangement of parts must be so as to be readily disassembled for inspection, yet avoid any excess weight or weakness, the latter of which might result in bursting or buckling under shock loads incident to landing.

It is accordingly an object of this invention to provide an improved arrangement of packing adapted to slidably engage a protected inside surface of one of a pair of telescopic members.

A further object of the invention is to provide an improved strut having telescopic members and a packing carried by the inner member, together with means for preventing the packing from shifting upon the inner carrying means during relative movement between members.

A still further object of the invention is to provide a shock strut having telescopic members with a packing carried by the inner member and a means separate from the packing for preventing undue extension of the telescopic members.

Another object of the invention is to provide a shock strut having telescopic sections and a packing carried by the inner member with means for fixing the maximum extension of the telescopic members, which means may cushion the shock either through the packing or by an auxiliary resilient means.

A still further object of the invention is to provide a novel piston head construction wherein the parts are secured together by a relatively simple but effective means.

A further object is to provide an improved valve construction for aiding in preventing rebound.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing, wherein like reference numerals indicate like parts:

Fig. 1 illustrates a longitudinal section of one form of shock strut embodying certain features of the invention, and Fig. 2 illustrates a longitudinal section of a slightly modified form of shock strut also illustrating certain features of the invention.

Referring to the drawing and particularly Fig. 1 therein, there is shown a shock strut comprising an outer cylindrical casing member 12 having a lower flanged end cap and clevis member 14 and welded or otherwise secured to the casing as at 16. Adapted for telescopic movement within the outer casing 12, is an inner cylindrical member 20 fitted at its upper end with a flanged end cap and clevis 22, welded or otherwise secured to the member 20.

On the outer surface of the lower end of the inner cylindrical member 20 is threaded a collar 24 having an inwardly extending flange 26, which together with a complementary flanged annular member 28 having an orifice 30, forms a piston adapted to reciprocate within the outer cylinder casing 12.

The piston orifice 30, as shown is adapted to cooperate with a metering pin 32 which is secured centrally to the end 14 of the cylinder casing. A tubular housing 34 having a length substantially that of the metering pin, is secured by means of a flange 36 to the end of the inner cylindrical member 20, the flange being clamped together with the orifice member 28 between the inwardly extending flange 26 of the collar and the end of the said inner cylindrical member 20. To prevent loosening of the collar 24 on the cylinder member 20, set screws 40 threaded in apertures in the collar extend into apertures in the said cylindrical member, thereby preventing the parts from turning.

In order that the tubular housing may function to snub rebound, it is preferably provided at its upper end with a flap valve, a simplified construction of which is illustrated at 42. The same comprises a plurality of headed pins 44 welded or otherwise secured to the side wall of the tube 34 in spaced formation and a valve plate 46 suitably apertured to slide upon the pins, the plate when opened being adapted to bear against the head of the pins 44, but being adapted to seat tightly upon the end 48 of the housing 34 when closed.

Bleed apertures 50 may be provided in the side of the tube to allow slow return of the shock strut toward extended position.

To prevent leakage between the telescopic members, a packing 59 carried on the inner cylinder is arranged between the shoulder 54 formed by the collar 24 and a sleeve-like collar 58 threaded upon the inner cylindrical member 20, and in order that the packing material located between the collars 58 and 24 may bear against a smooth exterior surface 61 of the cylindrical member 20, the sleeve 58 is provided with an unthreaded and overhanging extension 62 and is threaded upon an enlarged portion of the member 20 so that the same may be slid over the smooth portion 63 adjacent the packing material. The particular type of packing illustrated is of the U section type which is so placed that pressure due to liquid tending to escape expands the same against the walls of the telescopic members. A loose packing retaining ring 64 which abuts the sleeve 58 is adapted to provide the necessary bearing area for the upper end of the packing and a lock or jam nut 66 is provided to securely fix the collar 58.

In the particular modification of Fig. 1, the maximum extension of the strut is controlled by engagement of an annular ring 68 adjustably threaded on the member 20, which ring is adapted to engage a resilient ring 70 which in turn is arranged in abutment with the end collar 72. The end collar which forms a guide for the inner cylinder, is preferably made snug in its fit within the cylinder 12 and is provided with a shoulder 74 of sufficient height to bear against the end of the outside cylinder member 12. A flanged nut 76 is threaded upon the outside wall of the outer cylinder 12 so that flange 78 thereof may engage and securely fasten the collar 72 in place. It should be noted that the collar 72 affords support against crushing of the casing 12 due to forces which might result from the threaded engagement of the nut 76. The resilient block 70 may be of rubber-like substance or of any yielding composition and serves the purpose of absorbing sudden shock due to extension of the strut since in a strut of this type there is not only the weight of the landing wheels to extend the strut but force of the compressed gas within the strut as well.

In Fig. 2 there is shown a slightly modified form of strut which comprises telescopic outer and inner cylinders 112 and 120 which are provided on their respective remote ends with end closures 114 and 122 welded or otherwise suitably secured to the cylinders. A metering pin 132, secured to the end closure 114, coacting with an orificed piston carried by the inner cylinder, is adapted to control the rate of flow of fluid from one cylinder to the other. As shown the piston comprises, an annular member 124 having an internal shoulder 126, threaded on the outer wall of the cylinder 120 so that the shoulder engages the end of the cylinder. An orifice bushing 128 is secured to the shoulder 126 by fastening means 130 which may also secure the flange 136 of the housing member 134 to the shoulder. This housing member is provided with leak orifices 150 together with a valve plate 146 adapted to engage the end of the housing member 134, which valve plate in its opening and closing movement is adapted to ride on pins 144.

As in Fig. 1, packing material 159 is provided upon a smooth portion of the cylinder wall 120, which wall is slightly enlarged adjacent thereto and provided with a thread to engage the collar or sleeve 158 and jam nut 166. As in Fig. 1, the sleeve 158 is preferably provided with an overhanging extension 162 which is adapted to engage a loose packing retaining ring 164.

To fix the maximum extension of this modification of strut, a sleeve 171 which is slidably mounted within the outer cylinder 112 is adapted to engage the end collar 172 which collar is secured in position by its shoulder 174 and flanged nut 176. The sleeve 171 after engaging with the collar 172 arrests movement of the packing retaining ring 164 which in turn transmits any shock to the packing material which is of a resilient or yielding nature.

In operation the strut is filled through the filler plug 90 (or 190, Fig. 2) to its proper level with a suitable liquid, this level being sufficient to fill the lower cylinder at least sufficiently to cover the piston and central orifice on the upper cylinder and the metering pin housing bleed ports when the strut is fully extended. Air is then pumped into the upper cylinder until a pressure of around 40 atmospheres is obtained, this pressure being variable to suit the load conditions and strut diameter. Upon landing, the cylinders are caused to telescope forcing liquid through the central metered orifice and into the pin housing chamber thereabove and through the check valve into the upper cylinder. The air or gas in the upper cylinder is thus further compressed and resiliently supports the taxiing load after a certain amount of initial shock absorbing relative movement. Rebound is prevented by the closing of the check valve necessitating the liquid to return to the lower chamber or cylinder through the bleed holes in the side wall of the metering pin housing. During "taking off", the strut merely extends slowly due to the fact that the bleed ports restrict return flow of the liquid from the upper casing to the lower casing. Extension movement, however, is assured due to the high air pressure in the upper chamber. In the construction of Fig. 1, extension is limited when the collar 68 abuts the yielding annular block 70. The packing 59 is thereby not caused to shift relative to the inner cylinder, as may be the case in the modification of Fig. 2, when the sleeve 171, at the end of the stroke, engages the retaining ring 164 and tends to compress the packing.

Though only two embodiments of the invention have been illustrated and described, it is to be understood that the invention is not limited thereto but may be embodied in various other mechanical arrangements and forms. As various changes in construction and arrangement may be made without departing from the spirit of the invention, as will be apparent to those skilled in the art, reference will be had to the appended claims for a definition of the limits of the invention.

What is claimed is:

1. A shock strut comprising inner and outer telescopic members, end closures for the remote ends of said members, an orificed piston on the other end of the inner telescopic member, said piston slidably engaging the internal wall of the outer telescopic member, a packing carried by the inner member adjacent the end thereof, a collar arranged on the other end of said outer member, slidably engaging the inner member, a metering pin carried by the end closure of said outer member, said pin cooperating with said orificed piston, and means within the annular space formed between the telescopic members, packing and collar for limiting the extension stroke of the strut.

2. A shock strut comprising inner and outer telescopic members, end closures for the remote ends of said members, an orificed piston on the other end of the inner telescopic member, said piston slidably engaging the internal wall of the outer telescopic member, a packing carried by the inner member adjacent the end thereof, a collar arranged on the other end of said outer member slidably engaging the inner member, a metering pin carried by the end closure of said outer member, said pin cooperating with said orificed piston, a tubular pin housing substantially the length of said metering pin secured to the orificed piston upon the side remote from said pin carrying end closure, and a check valve in said housing.

3. In a shock strut comprising inner and outer telescopic cylinders, a collar threaded on the exterior of one end of said inner cylinder, said collar having an end flange and an orificed bushing clamped between the end of said inner cylinder and the flange of said collar.

4. In a shock strut comprising inner and outer telescopic cylinders, a collar having an end flange threaded on the exterior of one end of said inner cylinder, an orificed bushing having a flange, and a tubular housing member having a flange, said bushing and housing flanges being clamped between the collar flange and the end of said inner cylinder.

5. In a shock strut comprising inner and outer telescopic cylinders, a collar having an end flange threaded on the exterior of one end of said inner cylinder, said collar adapted to reciprocate within the outer cylinder, an orificed bushing having a flange, a tubular housing member having a flange, said bushing and housing flanges being clamped between the collar flange and the end of said inner cylinder and means for securing the threaded collar in place.

6. In a shock strut having a metering pin and orifice member, a housing member secured to said orifice, a flap valve in the end of said housing comprising a plurality of headed pins arranged in spaced formation and secured to the exterior of said housing adjacent the end thereof and extending beyond the end, and a valve plate slidably secured on the pins, adapted to engage the end of said housing to close the same, or adapted to be forced away from said housing into engagement with the heads of said pins to open the valve.

7. In a shock strut, a metering pin housing comprising a tubular member terminating in a smooth end forming a valve seat, a valve plate adapted to cooperate with the end, and spaced pins secured to the exterior of said member adjacent the valve end for guiding said valve plate.

8. In a shock strut having inner and outer telescopic cylinders and end closures for the remote ends thereof, a packing carried by the other end of said inner cylinder, said packing being carried upon a smooth portion of said inner cylinder and located between collars threaded on said cylinder, the collar remote from the end being threaded upon a portion of said cylinder of larger diameter than the smooth portion.

9. In a shock strut, a cylindrical member, exterior threads on the end thereof, an end collar threaded thereon, a smooth section adjacent the threaded section, packing material located on said smooth portion, a section of enlarged diameter having threads therein adjacent said smooth section, a collar threaded on said enlarged portion and having an undercut unthreaded extension on the side adjacent the packing, and a retaining ring between said extension and said packing.

10. In a shock strut, a cylindrical member, an internally flanged collar threaded on the exterior of said cylindrical member, a bushing having a central orifice adapted to seat on one side of the flange of said collar, a tubular member having a flange adapted to seat on the other side of the collar flange, and means securing the flange of the tubular member and bushing to said collar.

11. In a shock strut, a tubular cylindrical member having a threaded exterior end portion, a smooth exterior cylindrical surface adjacent said threaded portion, and a thickened central portion adjacent said smooth surface, said thickened portion being provided with threads at the end thereof adjacent the smooth exterior surface, the root diameter of which is at least as great as the smooth cylindrical surface, spaced collars threaded on said threaded portions, and packing material retained on said member between said collars.

12. A shock strut comprising inner and outer telescopic cylindrical casings closed at their remote ends, a guide collar on the other end of said outer cylinder, a thickened central portion on said inner cylinder adapted to slidably engage said guide block, said thickened central portion terminating short of the other end of the inner cylinder and being threaded and fitted with a sleeve, packing material carried on said inner cylinder between said sleeve and an end collar secured to the said other end of the inner cylinder.

13. A tubular member having a smooth central cylindrical portion, and an end portion of reduced diameter and thickness, the end of said central portion adjacent the reduced portion being threaded, and the adjacent reduced end portion having a smooth cylindrical surface and threaded at its end, spaced collars threaded on said threaded portions, and packing material retained on said member between said collars.

14. A shock strut comprising inner and outer telescopic members, end closures for the remote ends of said members, damping liquid in the strut, an orificed piston on the other end of the inner telescopic member, said piston slidably engaging the internal wall of the outer telescopic member, a packing carried by the inner member adjacent the end thereof, a collar arranged on the other end of said outer member, slidably engaging the inner member, a metering pin carried by the end closure of said outer member, said pin cooperating with said orificed piston and means for snubbing rebound including a check valve within the strut and acting on the liquid.

CARL V. JOHNSON.